United States Patent
Xie

(10) Patent No.: US 9,713,169 B2
(45) Date of Patent: Jul. 18, 2017

(54) METHOD AND APPARATUS FOR CONTROLLING STARTUP OF REQUEST TO SEND/CLEAR TO SEND MECHANISM

(71) Applicant: Spreadtrum Communications (Shanghai) Co., Ltd., Zhangjiang, Shanghai (CN)

(72) Inventor: Xin Xie, Shanghai (CN)

(73) Assignee: SPREADTRUM COMMUNICATIONS (SHANGHAI) CO., LTD., Zhangjiang, Shanghai (CN)

(*) Notice: Subject to any disclaimer, the term of this patent is extended or adjusted under 35 U.S.C. 154(b) by 154 days.

(21) Appl. No.: 14/678,199

(22) Filed: Apr. 3, 2015

(65) Prior Publication Data

US 2016/0037502 A1  Feb. 4, 2016

(30) Foreign Application Priority Data

Aug. 1, 2014 (CN) .......................... 2014 1 0377505

(51) Int. Cl.
*G01R 31/08* (2006.01)
*H04W 74/08* (2009.01)
*H04W 84/12* (2009.01)

(52) U.S. Cl.
CPC ............ *H04W 74/08* (2013.01); *H04W 84/12* (2013.01)

(58) Field of Classification Search
CPC .............................. H04W 74/08; H04W 84/12
See application file for complete search history.

(56) References Cited

U.S. PATENT DOCUMENTS

| | | | | |
|---|---|---|---|---|
| 9,480,069 B2* | 10/2016 | Sadek | ................. | H04W 72/082 |
| 2004/0258040 A1* | 12/2004 | Joshi | ...................... | H04W 4/14 370/349 |
| 2005/0243782 A1* | 11/2005 | Sakoda | .................... | H04L 47/10 370/338 |
| 2006/0171445 A1* | 8/2006 | Batra | ..................... | H04B 1/719 375/130 |
| 2008/0144493 A1* | 6/2008 | Yeh | ........................ | H04W 52/50 370/230 |
| 2009/0124205 A1* | 5/2009 | Aboba | ................. | H04B 17/382 455/63.1 |
| 2009/0135972 A1* | 5/2009 | Tanaka | ................. | H04B 1/1027 375/346 |
| 2014/0226506 A1* | 8/2014 | Sadek | .................. | H04J 3/1694 370/252 |

(Continued)

*Primary Examiner* — Robert Wilson
(74) *Attorney, Agent, or Firm* — Cantor Colburn LLP

(57) ABSTRACT

Method and apparatus for controlling startup of RTS/CTS mechanism is provided. The method includes: obtaining a noisy level of a channel based on the number of first data received by a first terminal in a first period, where the first terminal is a STA or an AP in a wireless network, and the first data include aggregation frames or non-aggregation frames; and if the noisy level is greater than or equal to a noisy level threshold, controlling the first terminal to start up the RTS/CTS mechanism when data is transmitted in a second period which is following and adjacent to the first period along a time axis. The noisy level of the channel may be obtained in real time, and the RTS/CTS mechanism may be controlled to be started up reasonably in real time, so that channel resources is utilized sufficiently, and a throughput rate is improved.

15 Claims, 3 Drawing Sheets

(56) References Cited

U.S. PATENT DOCUMENTS

| | | | |
|---|---|---|---|
| 2014/0286203 A1* | 9/2014 | Jindal | H04J 11/0026 |
| | | | 370/278 |
| 2016/0037502 A1* | 2/2016 | Xie | H04W 74/08 |
| | | | 370/330 |
| 2016/0088618 A1* | 3/2016 | Barriac | H04W 74/0816 |
| | | | 370/329 |
| 2016/0105271 A1* | 4/2016 | Shahrnaz | H04L 5/0058 |
| | | | 370/329 |

* cited by examiner

METHOD AND APPARATUS FOR CONTROLLING STARTUP OF REQUEST TO SEND/CLEAR TO SEND MECHANISM

CROSS-REFERENCE TO RELATED APPLICATIONS

The present invention claims priority under 35 U.S.C. §119 to Chinese patent application No. 201410377505.X, filed on Aug. 1, 2014, the entire content of which is incorporated herein by reference.

FIELD OF THE DISCLOSURE

The present disclosure generally relates to communication technology field, and more particularly, to a method and an apparatus for controlling startup of a request to send/clear to send mechanism.

BACKGROUND OF THE DISCLOSURE

Institute of Electrical and Electronics Engineers (IEEE) 802.11 is a set of air interface specifications in wireless local area network developed for Dedicated Short Range Communication (DSRC) by IEEE Committee, which provides wireless network service based on a competition scheme. In IEEE 802.11 wireless network, before transmitting a data packet, a station (STA) or an access point (AP) needs to monitor a channel to determine whether the channel is clear, and if yes, experience a random back-off process. Or else, the STA or AP cannot transmit the data packet and needs to monitor the channel again.

When the channel is noisy and busy, communication efficiency may be relatively low. Furthermore, a sending terminal may be even blocked from obtaining channel resources for a long time. In such occasion, a request to send/clear to send (RTS/CTS) mechanism may be used when data is transmitted, so as to obtain the channel resources for a certain time period. As such effective communication may continue.

As stipulated in the RTS/CTS mechanism, before transmitting data, a sending terminal needs to broadcast a RTS message to apply for a using permission and a using duration of the channel. When the RTS message is received by a receiving terminal, the receiving terminal may allocate the using permission and the using duration of the channel for the sending terminal according to a current channel occupation situation and further broadcast a CTS message which includes the allocation. Other sending terminals in the communication environment may receive the RTS and CTS messages. The sending terminal which obtains the using permission may use the channel in a certain time period, while other sending terminals may no longer compete for occupation of the channel in the certain time period.

When the channel is relatively noisy, the RTS/CTS mechanism may be effective. However, when the channel is relatively clear, using the RTS/CTS mechanism may reduce an effective throughput rate.

In existing techniques, a retransmission frequency of a STA or an AP is used to determine whether it is necessary to deploy the RTS/CTS mechanism. When the retransmission frequency is relatively high and meets specific requirements, the STA or AP may use the RTS/CTS mechanism to clear a channel, to obtain channel resources for a certain time period. However, the retransmission frequency is only one indirect parameter which partially reflects a noisy level and a busy/clear state of the channel, and cannot reflect the noisy level and state of the channel entirely. Worse still, sometimes there is no relation between the retransmission frequency and the noisy level and state of the channel sometimes. That is to say, the existing techniques cannot reasonably determine whether to use the RTS/CTS mechanism, which may result in a low throughput rate.

In existing techniques, it is hard to determine whether to use the RTS/CTS mechanism according to a practical noisy level of the channel in time, and the throughput rate may be relatively low.

SUMMARY

In one embodiment of the present disclosure, a method for controlling startup of a request to send/clear to send (RTS/CTS) mechanism is provided, including: obtaining a noisy level of a channel based on the number of first data received by a first terminal in a first period, where the first terminal is a STA or an AP in a wireless network, and the first data include aggregation frames or non-aggregation frames; and if the noisy level of the channel is greater than or equal to a noisy level threshold, controlling the first terminal to start up the RTS/CTS mechanism when the first terminal transmits data in a second period, where the second period is following and adjacent to the first period along a time axis.

Optionally, the noisy level of the channel may decrease with the increment of a first ratio calculated based on Equation (1), $$A = C/B \qquad (1)$$

where A represents the first ratio, B represents the number of the first data received by the first terminal in the first period, and C represents the number of a first set of data among the first data received by the first terminal in the first period, where each MAC target address of the first set of data is the first terminal.

Optionally, the noisy level of the channel may be determined based on a norm of the noisy level of the channel, and the norm of the noisy level of the channel is determined by: obtaining a first number, where the first number is the number of physical layer protocol data units (PPDUs) received by the first terminal in the first period; obtaining a second number, where the second number is the number of Acknowledgement (ACK) frames or block ACK frames received by the first terminal in the first period; obtaining a third number, where the third number is the number of the first data received by the first terminal in the first period which are not ACK frames or block ACK frames and whose MAC target addresses are the first terminal; and if the difference between the first number and the second number is greater than or equal to a first threshold, determining the norm of the noisy level of the channel based on Equation (2), $$CCA\_Freq = 1 - \frac{Rx\_MPDU\_Cnt}{Rx\_PPDU\_Cnt - Rx\_ACK\_Cnt} \qquad (2)$$

where CCA_Freq is the norm of the noisy level of the channel, Rx_PPDU_Cnt is the first number, Rx_ACK_Cnt is the second number, and Rx_MPDU_Cnt is the third number.

Optionally, the method may further include: if the difference between the first number and the second number is less than the first threshold, determining the norm of the noisy level of the channel to be zero.

Optionally, the first threshold may be within a range from 1 to 10.

Optionally, the noisy level threshold may be within a range from 80% to 100%.

Optionally, the first period and the second period may be within a range from 100 ms to 500 ms.

In one embodiment of the present disclosure, an apparatus for controlling startup of a RTS/CTS mechanism is provided, including: a noisy level determination unit, configured to obtain a noisy level of a channel based on the number of first data received by a first terminal in a first period, where the first terminal is a STA or an AP in a wireless network, and the first data include aggregation frames or non-aggregation frames; and a controlling unit, configured to: if the noisy level of the channel is greater than or equal to a noisy level threshold, control the first terminal to start up the RTS/CTS mechanism when the first terminal transmits data in a second period, where the second period is following and adjacent to the first period along a time axis.

In embodiments of the present disclosure, based on the obtained noisy level of the channel, the first terminal may be controlled to start up the RTS/CTS mechanism when transmitting data in the second period, that is, the first terminal may adaptively detect the noisy level of the channel based on data obtained in the first period. When the channel is determined to be relatively noisy, that is, the noisy level of the channel reaches the noisy level threshold, the RTS/CTS mechanism may be started up when the first terminal transmits data in the second period, which may ensure timely and effective communication of the first terminal. When the noisy level of the channel is relatively low and the channel is relatively clear, the RTS/CTS mechanism may not be started up when the first terminal transmits data in the second period, thereby avoiding a decreased throughput rate which can be caused by starting up the RTS/CTS mechanism when the channel is clear. In embodiments of the present disclosure, the practical noisy level of the channel may be obtained in real time, and further the RTS/CTS mechanism may be controlled to be started up reasonably in real time, which may lead to good utilization of channel resources, and improve a throughput rate of wireless channel.

Based on the obtained norm of the noisy level of the channel, the noisy level of the channel may be detected effectively, a physical transmission performance of the channel may be reflected accurately, and further whether the RTS/CTS mechanism should be started up may be determined according to a relation between the noisy level and the noisy level threshold, which may improve the rationality and accuracy of startup of the RTS/CTS mechanism.

Further, the noisy level threshold may be within a range from 80% to 100%. Therefore, the RTS/CTS mechanism may be started up only if the noisy level of the channel is greater than the noisy level threshold, that is, the RTS/CTS mechanism is started up when the channel is relatively noisy or busy, which may ensure efficiency of communication and improve the throughput rate of the wireless channel effectively.

DETAILED DESCRIPTION OF THE DISCLOSURE

To obtain channel resources, a RTS/CTS mechanism may be used when data is transmitted, to obtain the channel resources for a certain time period. When the channel is relatively noisy, the RTS/CTS mechanism may be effective. However, when the channel is relatively clear, the RTS/CTS mechanism may reduce an effective throughput rate. In existing techniques, it is hard to determine whether to use the RTS/CTS mechanism according to a practical noisy level of the channel in time, and the throughput rate may be relatively low.

In an embodiment, a method for controlling startup of a RTS/CTS mechanism is provided.

Figure 1:
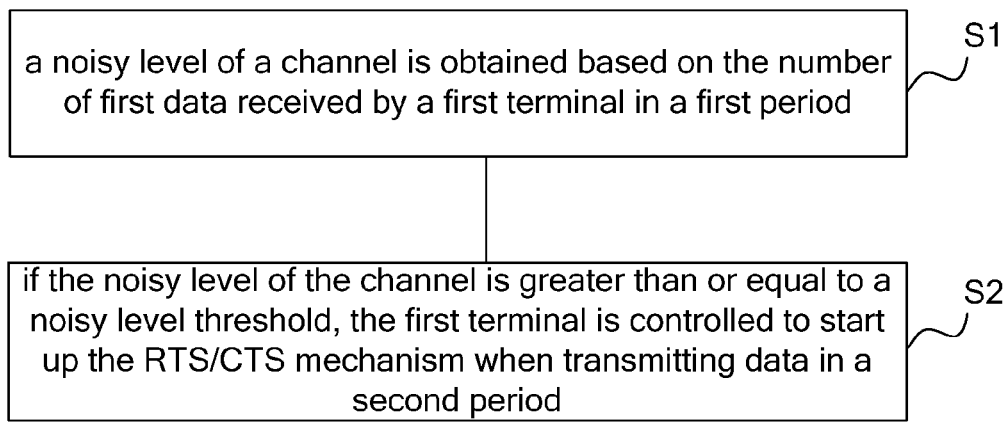
FIG. 1 schematically illustrates a flow chart of a method for controlling startup of a RTS/CTS mechanism according to an embodiment of the disclosure.

Referring to FIG. 1, in S1, a noisy level of a channel is obtained based on the number of first data received by a first terminal in a first period.

The first data include aggregation frames or non-aggregation frames. In some embodiments, the aggregation frame may be one selected from aggregation-media access control protocol data unit (A-MPDU), aggregation-media access control service data unit (A-MSDU) or a combined aggregation frame, where the combined aggregation frame may be a multi-level aggregation frame consisting of media access control protocol data unit (MPDU) and media access control service data unit (MSDU). In some embodiments, the non-aggregation frame may be MPDU.

In some embodiments, the first terminal may be a STA or an AP in a wireless network.

To determine whether to start up the RTS/CTS mechanism when the first terminal transmits data according to the noisy level of the channel, a time range may be divided into a plurality of time interval sequences, i.e., a plurality of time periods. Based on statistical data of MPDUs received by the STAs or APs in a current time period, the noisy level of the channel may be determined, and further the startup of the RTS/CTS mechanism may be controlled in a time period which is following and adjacent to the current time period based on the noisy level of the channel determined in the current time period.

In embodiments of the present disclosure, the first period is used to represent the current time period the STAs or APs stay, and a second period is used to represent the time period which is following and adjacent to the current time period along a time axis.

In S2, if the noisy level of the channel is greater than or equal to a noisy level threshold, the first terminal is controlled to start up the RTS/CTS mechanism when transmitting data in a second period, where the second period is following and adjacent to the first period along a time axis.

The startup of the RTS/CTS mechanism by the first terminal in the second period may be controlled adaptively based on the noisy level of the channel determined in the first period.

In some embodiments, if the noisy level of the channel determined in the first period is relatively high, to enable the first terminal to obtain an opportunity of occupying the channel, the RTS/CTS mechanism may be started up in the second period; and else, the RTS/CTS mechanism may not be started up in the second period, which may ensure a throughput rate of STAs or APs in a system.

In embodiments of the present disclosure, the practical noisy level of the channel may be obtained in real time, and further the RTS/CTS mechanism may be controlled to be started up reasonably in real time, so that channel resources may be utilized efficiently, and the throughput rate of the channel may be improved.

In order to clarify the objects, characteristics and advantages of the disclosure, embodiments of present disclosure will be described in detail in conjunction with accompanying drawings.

In some embodiments, the noisy level of the channel in the first time period may be determined, and further whether the RTS/CTS mechanism is started up by the first terminal in the second period may be controlled based on the noisy level of the channel.

The RTS/CTS mechanism is a message control mechanism. The principle lies in that, before transmitting a data packet to a receiver, a sender needs to send a RTS frame as a request for sending data to the receiver to apply for the occupation of a channel, and after receiving the RTS frame, the receiver needs to send a CTS frame including permission of sending as a response to the sender in a short inter-frame space (SIPS), to inform the sender that the receiver has got ready to receive data, and to inform other stations to keep silent during a duration, which is specified in the RTS frame, to avoid collision.

In some embodiments, a time may be divided into statistical time interval sequences with an interval of T. A current time interval with the length of T is the first time period, and a time interval which is following and adjacent to the current time interval is the second time period.

To control the startup of the RTS/CTS mechanism in the next time period T based on the noisy level of the channel in the current time period T in real time, the time interval T may not be set too long. In some embodiments, the time interval T may be within a range from 100 ms to 500 ms, that is, the first period and the second period may be within a range from 100 ms to 500 ms. In some embodiments, the first period and the second period may be determined further based on practical experiment data, a state of the channel, and so on. In embodiments of the present disclosure, the first period and the second period may be not limited.

Figure 2:
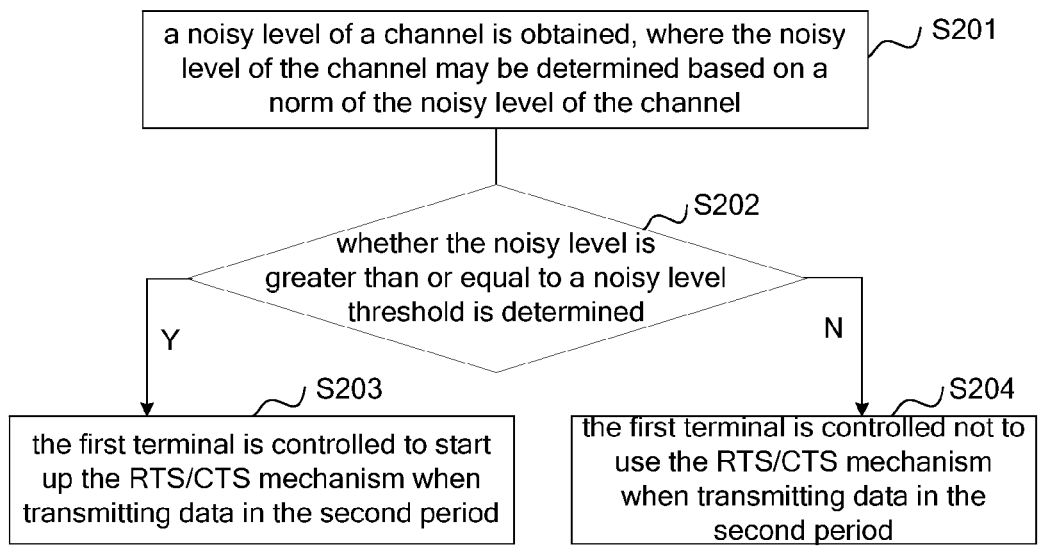
FIG. 2 schematically illustrates a flow chart of a method for controlling startup of a RTS/CTS mechanism according to an embodiment of the disclosure.

FIG. 2 schematically illustrates a flow chart of a method for controlling startup of a RTS/CTS mechanism according to an embodiment of the disclosure. Referring to FIG. 2, in S201, a noisy level of a channel is obtained, where the noisy level of the channel may be determined based on a norm of the noisy level of the channel.

In some embodiments, the noisy level of the channel may be determined based on the number of first data received by a first terminal in a first period whose MAC target addresses are the first terminal.

In some embodiments, the noisy level of the channel may decrease with the increment of a first ratio calculated based on Equation (1), $$A = C/B \qquad (1)$$

where A represents the first ratio, B represents the number of the first data received by the first terminal in the first period, and C represents the number of a first set of data among the first data received by the first terminal in the first period, where each MAC target address of the first set of data is the first terminal.

Hereinafter, determination of the noisy level of the channel is described in detail in conjunction with a formula.

In some embodiments, the noisy level of the channel may be determined based on the norm of the noisy level of the channel. The greater the norm is, the noisier the channel is.

Figure 3:
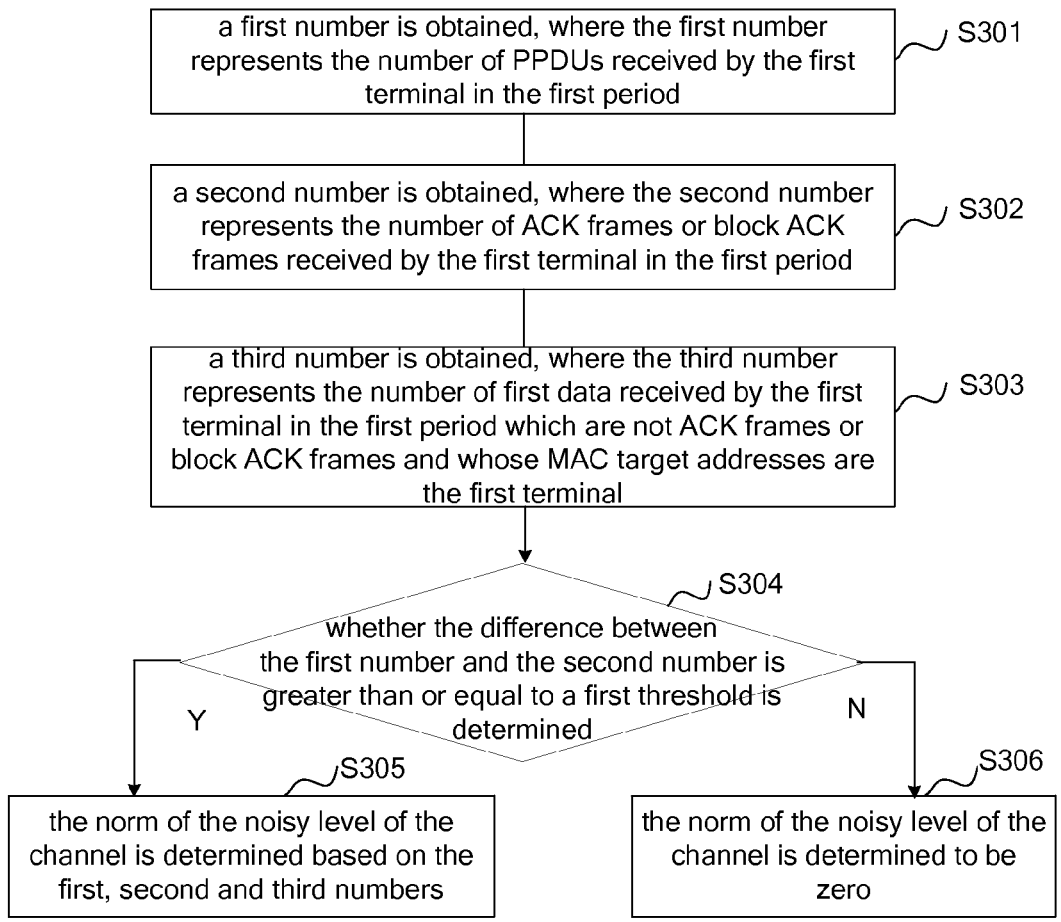
FIG. 3 schematically illustrates a flow chart of a method for determining a norm of a noisy level of a channel according to an embodiment of the disclosure.

FIG. 3 schematically illustrates a flow chart of a method for determining the norm of the noisy level of the channel according to an embodiment of the disclosure. Referring to FIGS. 3, S301 to S303 may be performed to obtain related statistical data in determination of the norm of the noisy level of the channel.

In S301, a first number is obtained, where the first number is the number of PPDUs received by the first terminal in the first period.

The first number is counted and represented by Rx_PPDU_Cnt.

In S302, a second number is obtained, where the second number is the number of ACK frames or block ACK frames received by the first terminal in the first period.

The second number is counted and represented by Rx_ACK_Cnt.

ACK or block ACK is a message acknowledgement mechanism which is used to ensure the transmission reliability of air interface data.

During a message transmission process, to each IEEE802.11 message transmitted by a sending terminal (for example, the first terminal), a receiving terminal, after receiving it, needs to perform an ACK or block ACK acknowledgement. If receiving the ACK or block ACK acknowledgement, the sending terminal may determine that the message is successfully transmitted and send a next frame; else, the sending terminal may retransmit the message.

In S303, a third number is obtained, where the third number is the number of the first data received by the first terminal in the first period which are not ACK frames or block ACK frames and whose MAC target addresses are the first terminal.

The third number is counted and represented by Rx_MPDU_Cnt.

In some embodiments, the first data are aggregation frames, and the third number is the number of the aggregation frame received by the first terminal in the first period which are not ACK frames or block ACK frames and whose MAC target addresses are the first terminal. In some embodiments, the first data are non-aggregation frames, and the third number is the number of the non-aggregation frame received by the first terminal in the first period which are not ACK frames or block ACK frames and whose MAC target addresses are the first terminal.

The third number may be obtained by using a filtering method based on frame types. For example, frames related to ACK or block ACK acknowledgement mechanisms may be filtered out, and a portion of the remained first data whose MAC target addresses are the first terminal is counted to obtain the third number.

The first terminal may obtain the first data based on the PPDU received from demodulation in the physical layer and upload the first data to a MAC layer. The first data whose MAC target addresses are the first terminal may be counted.

Based on the data obtained from S301 to S303, the norm of the noisy level of the channel may be obtained.

It should be noted that, S301 to S303 can be performed in any order to obtain the required statistical data.

After S301, S302 and S303, S304 is performed. In S304, whether the difference between the first number and the second number is greater than or equal to a first threshold is determined.

The first threshold may be determined based on experience data, experiment data, and so on.

In some embodiments, the first and second periods may be within a range from 100 ms to 500 ms. Based on experiment data, the first threshold may be set to be within a range from 1 to 10. In some embodiments, the first threshold may be determined based on practical experiment data, a state of the channel and so on, and is not limited here.

If the difference between the first number and the second number is greater than or equal to the first threshold, S305 is performed; else, S306 is performed.

In S305, the norm of the noisy level of the channel is determined based on the first, second and third numbers according to Equation (2), $$CCA\_Freq = 1 - \frac{Rx\_MPDU\_Cnt}{Rx\_PPDU\_Cnt - Rx\_ACK\_Cnt} \quad (2)$$

where CCA_Freq is the norm of the noisy level of the channel, Rx_PPDU_Cnt is the first number, Rx_ACK_Cnt is the second number, and Rx_MPDU_Cnt is the third number.

In S306, the norm of the noisy level of the channel is determined to be zero.

As the first number is the number of the PPDUs received by the first terminal in the first period, and the second number is the number of ACK frames or block ACK frames received by the first terminal in the first period, the difference between the third number and the fourth number is the number of the PPDUs received by the first terminal in the first period which are not ACK frames or block ACK frames. If the difference therebetween is relatively small, it indicates that the PPDUs received by the first terminal in the first period are almost data packets obtained by ACK or block ACK message acknowledgement mechanisms, and the noisy level of the channel has little interference on the statistical result. Under the message acknowledgement mechanisms, the channel is occupied by the first terminal, thus, the noisy level of the channel may be regarded as zero. That is, if the difference between the first number and the second number is less than the first threshold, the norm of the noisy level of the channel may be considered as zero.

Based on S301 to S306, the norm of the noisy level of the channel in the first period may be obtained.

Still referring to FIG. 2, after the norm of the noisy level of the channel is determined in S201, S202 may be performed.

In S202, whether the noisy level is greater than or equal to a noisy level threshold is determined.

The inventors considered that, the RTS/CTS mechanism should be started up when the first terminal transmits data, if the channel is relatively busy or noisy. Therefore, the noisy level threshold may be set to be relatively great. For example, the noisy level may be within a range from 0% to 100%. If the noisy level is around 100%, it indicates that the channel is quite noisy. Thus, in some embodiments, the noisy level threshold may be within a range from 80% to 100%. In some embodiments, the noisy level threshold may be determined based on practical experiment data, a state of the channel and so on, and is not limited here.

When it is determined that the noisy level is greater than or equal to the noisy level threshold based on statistical data of the first period, it indicates that the channel is quite noisy, and the RTS/CTS mechanism needs to be started up, to enhance the first terminal's ability of occupying the channel in data transmission. When it is determined that the noisy level is less than the noisy level threshold, it indicates that the noisy level of the channel is relatively low, that is, the channel is relatively clear, thus, the RTS/CTS mechanism does not need to be started up.

If it is determined that the noisy level of the channel is greater than or equal to the noisy level threshold, S203 may be performed; and else, S204 is performed.

In S203, the first terminal is controlled to start up the RTS/CTS mechanism when transmitting data in the second period.

As the channel is determined to be relatively noisy based on the statistical data of the first terminal in the first period, the RTS/CTS mechanism may be started up when the first terminal transmits data in the second period, to increase the possibility of the first terminal accessing the channel.

In S204, the first terminal is controlled not to use the RTS/CTS mechanism when transmitting data in the second period.

As the channel is determined to be relatively clear based on the statistical data of the first terminal in the first period, it is unnecessary for the terminal to use the RTS/CTS mechanism when transmitting data in the second period.

It should be noted that, in above embodiments, the method for determining the norm of the noisy level of the channel is provided. A value of the norm of the noisy level of the channel may be used to representing how noisy the channel is. In some embodiments, other methods may be employed to determine how noisy the channel is, and are not described in detail here.

It should be noted that, in above embodiments, the current time period is considered as the first period, and a time period which is following and adjacent to the first period along a time axis is considered as the second period. Based on the norm of the noisy level of the channel in the current period, the startup of the RTS/CTS mechanism in the following and adjacent period may be controlled in real time. To any time interval on the time axis, the startup of the RTS/CTS mechanism therein can be controlled based on the norm of the noisy level of the channel in a previous time interval. Similarly, the norm of the noisy level of the channel in a current time interval can be taken as a base in controlling of the startup of the RTS/CTS mechanism in a next time interval. Therefore, the startup of the RTS/CTS mechanism in each time period can be controlled flexibly and adaptively based on the noisy level of the channel in real time.

It should be noted that, in some embodiments, statistical data in the front of a time period may be obtained and used for controlling in the back-end of the time period, which is also within the scope of the present disclosure.

In embodiments of the present disclosure, when the channel is determined to be relatively noisy, that is, the noisy level of the channel reaches the noisy level threshold, the RTS/CTS mechanism may be started up when the first terminal transmits data in the second period, which may ensure timely and effective communication of the first terminal. When the noisy level of the channel is relatively low and the channel is relatively clear, the RTS/CTS mechanism may not be started up when the first terminal transmits data in the second period, thereby avoiding a decreased throughput rate which can be caused by starting up the RTS/CTS mechanism when the channel is clear. The channel resources may be utilized sufficiently, and the throughput rate of the wireless channel may be improved effectively.

Figure 4:
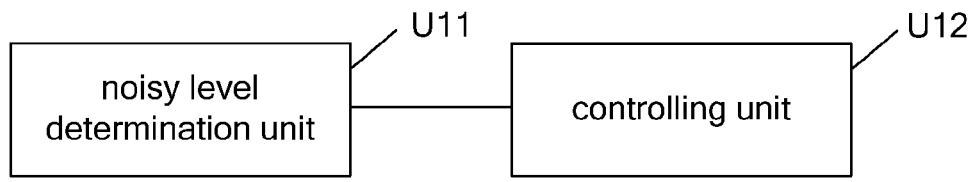
FIG. 4 schematically illustrates a structural diagram of an apparatus for controlling startup of a RTS/CTS mechanism according to an embodiment of the disclosure.

Accordingly, in an embodiment, an apparatus for controlling startup of a RTS/CTS mechanism is provided. Referring to FIG. 4, the apparatus includes a noisy level determination unit U11 and a controlling unit U12.

The noisy level determination unit U11 may be configured to obtain a noisy level of a channel based on the number of first data received by a first terminal in a first period, where the first terminal is a STA or an AP in a wireless network, and the first data include aggregation frames or non-aggregation frames.

In some embodiments, the noisy level of the channel may decrease with the increment of a first ratio calculated based on Equation (1), $$A = C/B \quad (1)$$

where A represents the first ratio, B represents the number of the first data received by the first terminal in the first period, and C represents the number of a first set of data among the first data received by the first terminal in the first period, where each MAC target address of the first set of data is the first terminal.

The controlling unit U12 may be configured to: if the noisy level of the channel is greater than or equal to a noisy level threshold, control the first terminal to start up the RTS/CTS mechanism when the first terminal transmits data in a second period, where the second period is following and adjacent to the first period along a time axis.

In some embodiments, the noisy level threshold may be within a range from 80% to 100%.

In some embodiments, the noisy level determination unit U11 may be configured to determine the noisy level of the channel based on a norm of the noisy level of the channel.

Figure 5:
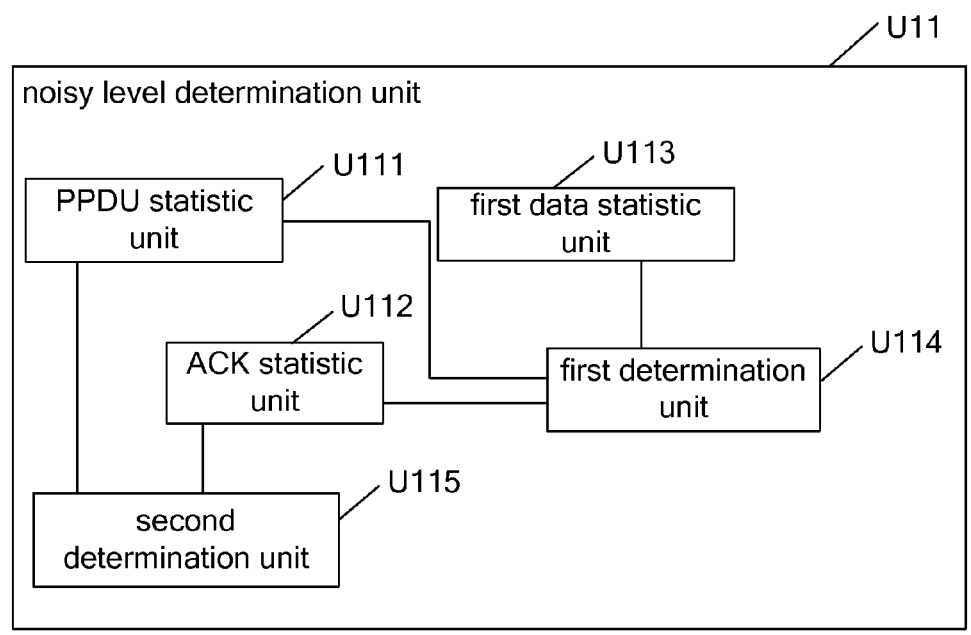
FIG. 5 schematically illustrates a structural diagram of a noisy level determination unit according to an embodiment of the disclosure.

FIG. 5 schematically illustrates a structural diagram of the noisy level determination unit U11 according to an embodiment of the disclosure. Referring to FIG. 5, the noisy level determination unit U11 includes a PPDU statistic unit U111, an ACK statistic unit U112, a first data statistic unit U113 and a first determination unit U114.

The PPDU statistic unit U111 may be configured to: obtain a first number, where the first number is the number of PPDUs received by the first terminal in the first period.

The ACK statistic unit U112 may be configured to: obtain a second number, where the second number is the number of ACK frames or block ACK frames received by the first terminal in the first period.

The first data statistic unit U113 may be configured to: obtain a third number, where the third number is the number of the first data received by the first terminal in the first period which are not ACK frames or block ACK frames and whose MAC target addresses are the first terminal.

The first determination unit U114 may be configured to: if the difference between the first number and the second number is greater than or equal to a first threshold, determine the norm of the noisy level of the channel based on Equation (2), $$CCA\_Freq = 1 - \frac{Rx\_MPDU\_Cnt}{Rx\_PPDU\_Cnt - Rx\_ACK\_Cnt} \quad (2)$$

where CCA_Freq is the norm of the noisy level of the channel, Rx_PPDU_Cnt is the first number, Rx_ACK_Cnt is the second number, and Rx_MPDU_Cnt is the third number.

The noisy level determination unit U11 may further include a second determination unit U115, configured to: if the difference between the first number and the second number is less than the first threshold, determine the norm of the noisy level of the channel to be zero.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for controlling startup of a request to send/clear to send (RTS/CTS) mechanism, comprising:
    obtaining, with a processor, a noisy level of a channel based on the number of first data received by a first terminal in a first period, where the first terminal is a station (STA) or an access point (AP) in a wireless network, and the first data comprise aggregation frames or non-aggregation frames; and
    if the noisy level of the channel is greater than or equal to a noisy level threshold, controlling, with the processor, the first terminal to start up the RTS/CTS mechanism when the first terminal transmits data in a second period, and transmitting data using the RTS/CTS mechanism in the second period, where the second period is following and adjacent to the first period along a time axis.

2. The method according to claim 1, wherein the noisy level of the channel decreases with the increment of a first ratio calculated based on Equation (1), $$A = C/B \quad (1)$$

where A represents the first ratio, B represents the number of the first data received by the first terminal in the first period, and C represents the number of a portion of the first data received by the first terminal in the first period, where a MAC target address of the portion of the first data is the first terminal.

3. The method according to claim 1, wherein the noisy level of the channel is determined based on a norm of the noisy level of the channel, and the norm of the noisy level of the channel is determined by:
    obtaining a first number, where the first number represents the number of physical layer protocol data units (PPDUs) received by the first terminal in the first period;
    obtaining a second number, where the second number represents the number of Acknowledgement (ACK) frames or block ACK frames received by the first terminal in the first period;
    obtaining a third number, where the third number represents the number of the first data received by the first terminal in the first period which are not ACK frames or block ACK frames and whose MAC target addresses are the first terminal; and
    if the difference between the first number and the second number is greater than or equal to a first threshold, determining the norm of the noisy level of the channel based on Equation (2), $$CCA\_Freq = 1 - \frac{Rx\_MPDU\_Cnt}{Rx\_PPDU\_Cnt - Rx\_ACK\_Cnt} \quad (2)$$

where CCA_Freq represents the norm of the noisy level of the channel, Rx_PPDU_Cnt represents the first number, Rx_ACK_Cnt represents the second number, and Rx_MPDU_Cnt represents the third number.

4. The method according to claim 3, further comprising: if the difference between the first number and the second number is less than the first threshold, determining the norm of the noisy level of the channel to be zero.

5. The method according to claim 3, wherein the first threshold is within a range from 1 to 10.

6. The method according to claim 3, wherein the noisy level threshold is within a range from 0.8 to 1.

7. The method according to claim 4, wherein the first threshold is within a range from 1 to 10.

8. The method according to claim 4, wherein the noisy level threshold is within a range from 0.8 to 1.

9. The method according to claim 1, wherein the noisy level threshold is within a range from 0.8 to 1.

10. The method according to claim 1, wherein the first period and the second period are within a range from 100 ms to 500 ms.

11. An apparatus for controlling startup of a request to send/clear to send (RTS/CTS) mechanism, comprising:
a noisy level determination circuitry, configured to obtain a noisy level of a channel based on the number of first data received by a first terminal in a first period, where the first terminal is a station (STA) or an access point (AP) in a wireless network, and the first data comprise aggregation frames or non-aggregation frames;
a controlling circuitry, configured to: if the noisy level of the channel is greater than or equal to a noisy level threshold, control the first terminal to start up the RTS/CTS mechanism when the first terminal transmits data in a second period, where the second period is following and adjacent to the first period along a time axis; and
a transmitting circuitry, configured to: transmit data using the RTS/CTS mechanism in the second period.

12. The apparatus according to claim 11, wherein the noisy level of the channel decreases with the increment of a first ratio calculated based on Equation (1), $$A = C/B \qquad (1)$$

where A represents the first ratio, B represents the number of the first data received by the first terminal in the first period, and C represents the number of a portion of the first data received by the first terminal in the first period, where a MAC target address of the portion of the first data is the first terminal.

13. The apparatus according to claim 11, wherein the noisy level determination circuitry is configured to determine the noisy level of the channel based on a norm of the noisy level of the channel, and comprises:
a physical layer protocol data unit (PPDU) statistic circuitry, configured to: obtain a first number, where the first number represents the number of PPDUs received by the first terminal in the first period;
an Acknowledgement (ACK) statistic circuitry, configured to: obtain a second number, where the second number represents the number of ACK frames or block ACK frames received by the first terminal in the first period;
a first data statistic circuitry, configured to: obtain a third number, where the third number represents the number of the first data received by the first terminal in the first period which are not ACK frames or block ACK frames and whose MAC target addresses are the first terminal; and
a first determination circuitry, configured to: if the difference between the first number and the second number is greater than or equal to a first threshold, determine the norm of the noisy level of the channel based on Equation (2), $$\text{CCA\_Freq} = 1 - \frac{\text{Rx\_MPDU\_Cnt}}{\text{Rx\_PPDU\_Cnt} - \text{Rx\_ACK\_Cnt}} \qquad (2)$$

where CCA_Freq represents the norm of the noisy level of the channel, Rx_PPDU_Cnt represents the first number, Rx_ACK_Cnt represents the second number, and Rx_MPDU_Cnt represents the third number.

14. The apparatus according to claim 13, wherein the noisy level determination circuitry further comprises a second determination circuitry, configured to: if the difference between the first number and the second number is less than the first threshold, determine the norm of the noisy level of the channel to be zero.

15. The apparatus according to claim 11, wherein the noisy level threshold is within a range from 0.8 to 1.

* * * * *